US006343805B1

(12) United States Patent
Roy

(10) Patent No.: US 6,343,805 B1
(45) Date of Patent: Feb. 5, 2002

(54) FOLDING WHEELCHAIR

(76) Inventor: Richard A. Roy, 6933 Temperance Point St., Westerville, OH (US) 43082-8706

(*) Notice: Subject to any disclaimer, the term of this patent is extended or adjusted under 35 U.S.C. 154(b) by 0 days.

(21) Appl. No.: 09/405,951

(22) Filed: Sep. 27, 1999

(51) Int. Cl.[7] .................................................. B62M 1/14

(52) U.S. Cl. ............... 280/250.1; 280/650; 297/411.31; 297/DIG. 4

(58) Field of Search ................................. 180/330, 907; 280/250.1, 226.1, 242.1, 278, 304.1, 40, 642, 647, 650; 297/DIG. 4, 411.31, 411.32

(56) References Cited

U.S. PATENT DOCUMENTS 1,902,709 A * 3/1933 King ..................... 297/411.31
3,968,991 A * 7/1976 Maclaren ................. 280/250.1
4,052,087 A * 10/1977 Gagliardi .................... 280/650
4,101,143 A * 7/1978 Sieber ........................ 280/647
4,500,102 A * 2/1985 Haury et al. ................ 280/647
4,730,869 A * 3/1988 Schumacher ........... 297/DIG. 4
4,863,181 A * 9/1989 Howie ........................ 280/650
5,244,223 A * 9/1993 Uchiyama ................ 280/250.1
5,544,940 A * 8/1996 Stevens ................. 297/DIG. 4
5,727,809 A * 3/1998 Ordelman et al. ....... 280/250.1
5,727,850 A * 3/1998 Masclet ................... 280/250.1
5,772,226 A * 6/1998 Bobichon ................ 280/250.1
5,855,387 A * 1/1999 Gill et al. ................ 280/250.1
5,894,902 A * 4/1999 Cho
6,032,975 A * 3/2000 Hanson et al. .............. 280/647

* cited by examiner

*Primary Examiner*—J. J. Swann
*Assistant Examiner*—Christopher Bottorff
(74) *Attorney, Agent, or Firm*—Dykema Gossett PLLC

(57) ABSTRACT

A folding wheelchair is provided which includes first and second spaced-apart posts. A rear wheel is rotatably mounted to each post. First and second spaced-apart side rails are pivotally connected with a respective post. First and second front legs are pivotally connected with a respective side rail having their lower ends extending downwardly. A front wheel is connected with each front leg. A side tensional support member is pivotally connected to each leg and to a respective post. To fold the seat together, the front ends of the side rails are pivoted toward an upper end of the post. To further save space, the rear wheels are rotatively connected to the post by a quick release pin arrangement allowing for their quick removal.

3 Claims, 5 Drawing Sheets

FOLDING WHEELCHAIR

FIELD OF THE INVENTION

This invention relates generally to wheelchairs for disabled persons, and more particularly to a wheelchair that folds to occupy little space while being stored or transported in a vehicle. Still more particularly, the present invention relates to a wheelchair that may be folded and partially disassembled to allow for convenient options in storage and space for transporting in a vehicle.

BACKGROUND OF THE INVENTION

Folded wheelchairs for disabled persons are well known in the art. Generally, folding wheelchairs are folded along a vertical axis that brings together the wheels of the chairs. With a canvas seat and a canvas back, such chairs may be readily and quickly unfolded to be placed into service.

While such folded wheelchairs have the advantage of quick assembly, they suffer from the disadvantage of bulk. Folding such a chair overcomes the width of the chair as a dimension across a front elevation of the chair, but does not overcome the height of the chair in the same elevation or the depth of the chair. Thus, there is still considerable bulk with regard to the overall volume that the chair might occupy in a place of storage or in the trunk of a vehicle. Moreover, this bulk controls remaining storage space or luggage space, as conventional folded wheelchairs are not adapted for easy disassembly so that parts of the wheelchair may be stored in convenient recesses to maximize storage space for other articles.

OBJECTS OF THE INVENTION

With the above-described difficulties accompanying most known folding wheelchairs in view, a primary object of the present invention is to provide a folding wheelchair that has an axis for folding which allows for a more advantageous profile for storing and transporting the folded wheelchair.

Another object of the present invention is to provide a folded wheelchair that has means for disassembling part of the wheelchair to take advantage of arranging storage of the wheelchair with storage of other articles in a limited storage space. These and other objects have been achieved by the present invention.

SUMMARY OF THE INVENTION

A folding wheelchair includes a pair of spaced apart posts with pivotally connected side rails. A front leg is pivotally connected to the side rail. A side tensional support structure is pivotally connected to each leg and extends rearwardly to the post. The side rails may be pivoted toward a top end of the posts to fold the wheel chair. A pair of front wheels are attached to the front legs, and a pair of quick release rear wheels are connected to the pairs of posts. Cross members provide seat and back structure to support a person seated in the wheelchair and to join or interconnect the spaced apart side frames and posts.

The above-noted objectives and other advantages of the present invention will become more apparent to those skilled in the art as the invention is further explained in the accompanying detailed description and drawings.

DETAILED DESCRIPTION OF THE PREFERRED EMBODIMENT

Figure 1:
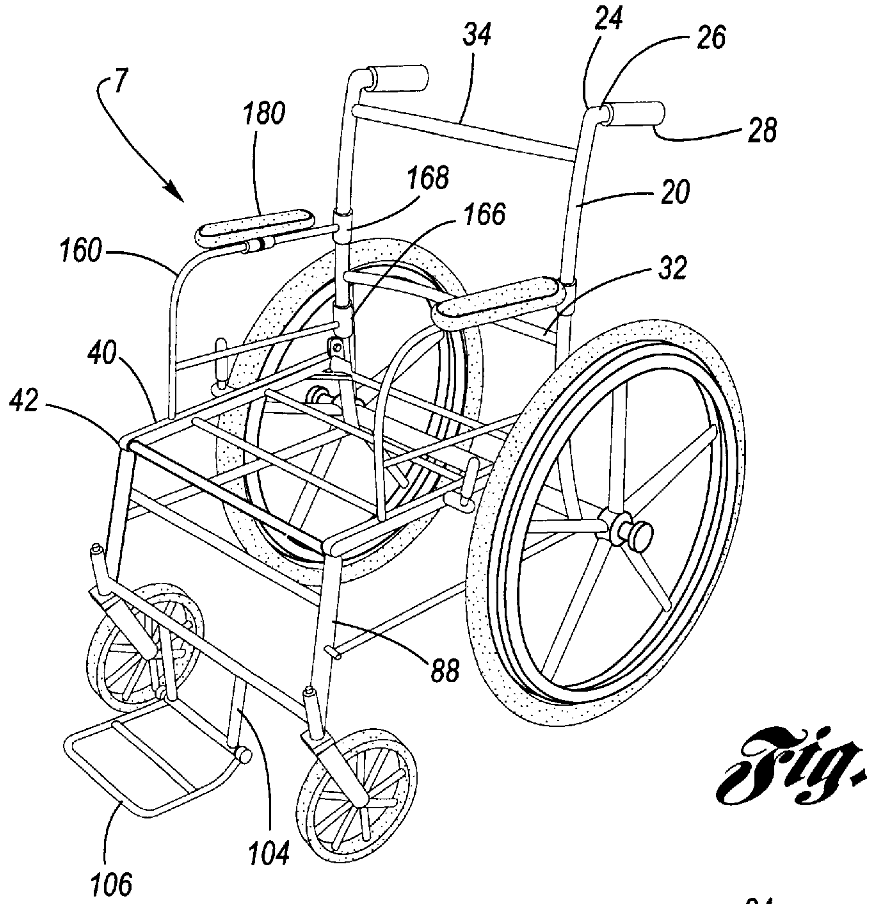
FIG. 1 is a perspective view of a preferred embodiment folding wheelchair according to the present invention with the pedal rest placed in a lower position.
Figure 2:
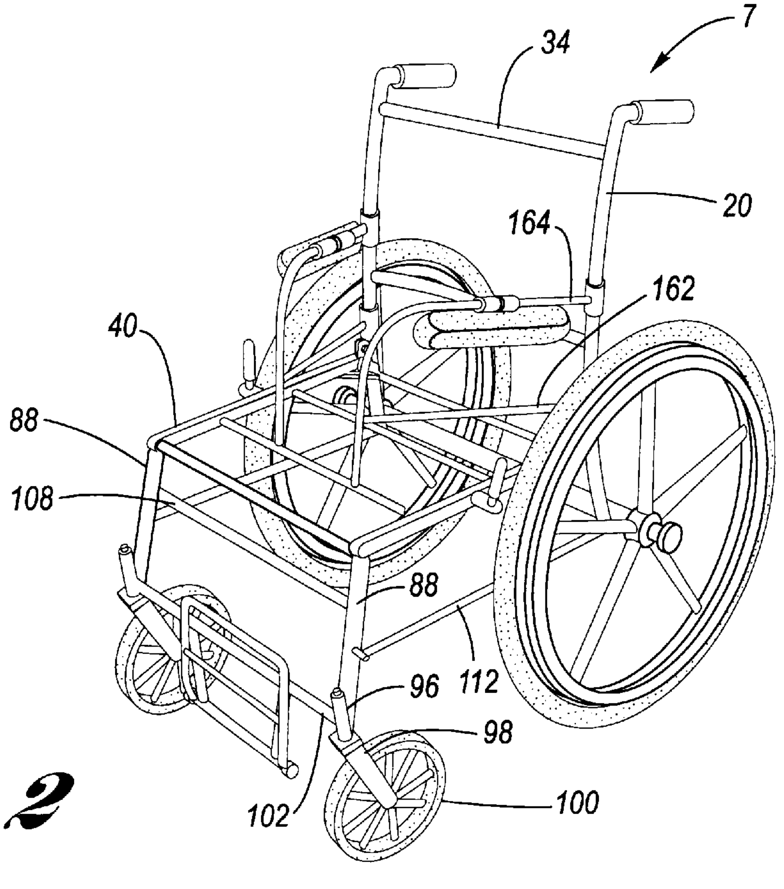
FIG. 2 is a perspective view similar to that of FIG. 1 illustrating the release of the upper side rails from the side rails and the pivotal positioning of the armrests.
Figure 6:
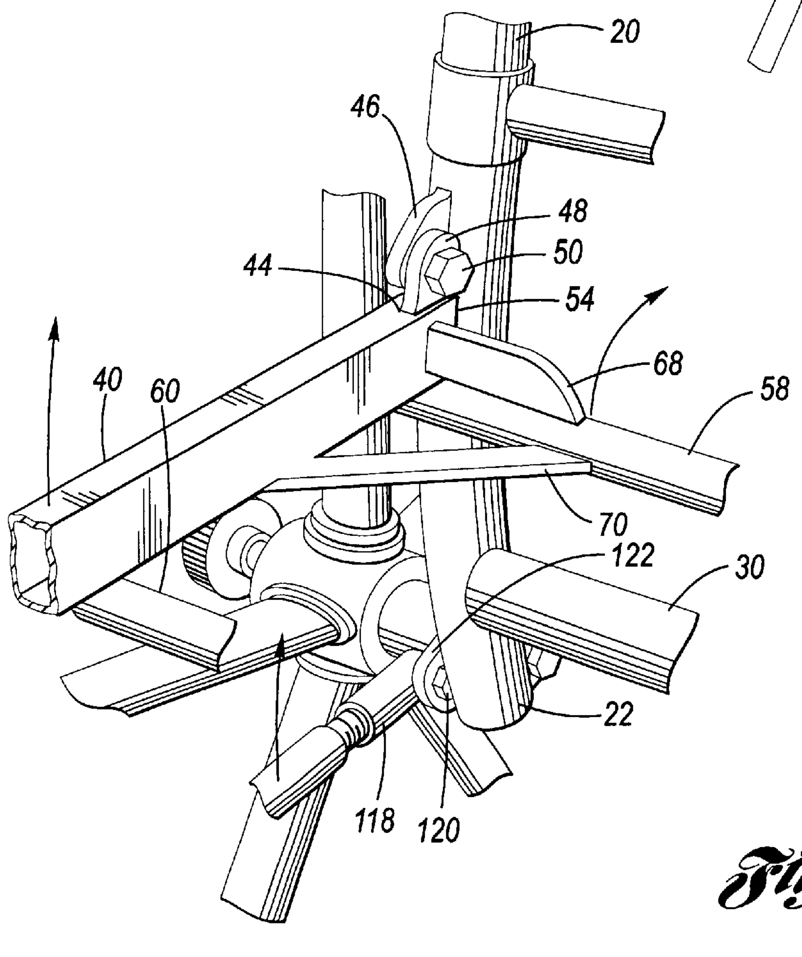
FIG. 6 is an enlarged cut-away view of a portion of the folding wheelchair shown in FIG. 1 illustrating the pivotal connection of the side rail with the post and a rotative connection of the rear wheel with the post.

Referring to FIGS. 1, 2 and 6, a folding wheelchair 7 according to the present invention has two posts 20. Each post 20 has a lower end 22 and an upper end 24. Post upper end 24 has a perpendicularly bent portion 26. Perpendicular portion 26 is encircled by a polymeric handle grip 28. The primary shape of posts 20 is generally arcuate having its bowed section orientated forwardly. The two posts 20 are generally parallel spaced from one another. Posts 20 are fabricated from a tubular steel or other suitable material. Joining posts 20 together is a lower post cross rail 30, mid-post cross rail 32, and an upper post cross rail 34. Mid-post cross rail 32 and upper post cross rail 34 form a back structure which extends between posts 20. Typically, a back cushion (removed from the drawing for clarity of illustration) covers post cross rails 34 and 32. As will also be apparent to those skilled in the art, post cross rails 30, 32 and 34 may be bowed as desired.

Extending forwardly from each respective post 20 is a side rail 40. Side rail 40 has a front end 42 and a rear end 44 (FIG. 6). Side rail 40 is fabricated from a rectangular, tubular, steel member having its major dimension in the vertical orientation. The two side rails 40 are generally parallel spaced from one another. Posts 20 have a welded forwardly projecting outboard bracket 46. Side rail 40 has a vertically oriented welded inboard bracket 48. A pivot pin 50 extends through apertures in brackets 46 and 48 thereby pivotally connecting side rail 40 to its respective post 20. Pivot pin 50 has a head (not shown) which abuts against bracket 46 and has a generally smooth shaft except an extreme end which is threadably joined to a nut which abuts bracket 48. In the upright position a rear surface 54 of side rail 40 either directly or through an elastomeric cushion (now shown) makes abutting contact against post 20. Connecting the two side rails 40 are a series of cross rails. A rearward most cross rail 58 joins the two side rails 40 at their rearward ends. Mid-cross rails 60 and 62 join side rails 40 between their forward and rearward ends 42 and 44. At a forward end, the side rails 40 are joined by a cross rail 64. Cross rails 62 and 60 connect with side rails 40 along a lower edge of the side rails 40. Cross rails 64 connects with the side rails 40 along a position more adjacent with a vertical mid-point of the side rails 40. Rear cross rail 58 is joined to the side rail 40 underneath but also has a wing 68 and a diagonal member 70 (FIG. 6). Cross rails 58, 60, 62 and 64, along with side rails 40 provide a seat structure for supporting a person thereon and also provide a nest for a seat pad (not shown). Attached to the outboard side of each side rail 40 is a wheel brake 72. The wheel brake has a handle 74 which can be manipulated to project a brake arm 76 (FIG. 3) towards the tires 80 of the wheel 82. Fixably joined to the underside of the side link 40 adjacent their front ends 42 is a downwardly projecting welded bracket 86 (FIG. 11).

Folding wheelchair 7 has two front legs 88 to support the front end of the wheelchair 7. Each front leg 88 is fabricated from a tubular steel material. Each front leg 88 has a slot 92 which receives bracket 86 of the side rail 40. A pivot pin having a head 94 pivotally connects the side rails 40 with the front leg 88. Front legs 88 have a lower end 96. Front leg lower end 96 rotatively mounts along an axis inclined with the vertical axis of front wheel fork 98. Front wheel fork 98 rotatively connects a front wheel 100. Extending between and connecting with the lower end 96 of the front legs is a lower cross rail 102. Cross rail 102 has connected thereto two downwardly extending subposts 104. Subposts 104 support an occupant footrest or pedal 106. In a method that is well known in the art, the angular position of pedal 106 can be adjusted with respect to the subposts 104 to thereby maximize occupant comfort. To provide added strength and stability, a leg cross post 108 is provided between the front legs.

Figure 7:
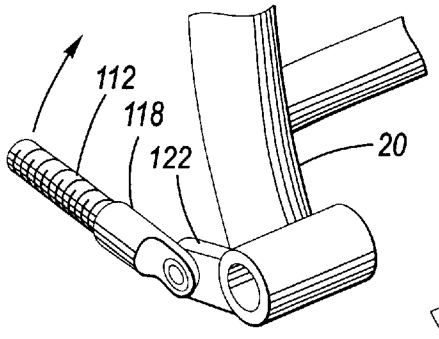
FIG. 7 is an enlarged cut-away perspective view of the wheelchair shown in FIG. 1 illustrating the pivotal connection of the post with a side tensional support member and illustrating the connection of the post with a pin mount for the rear wheel.
Figure 11:
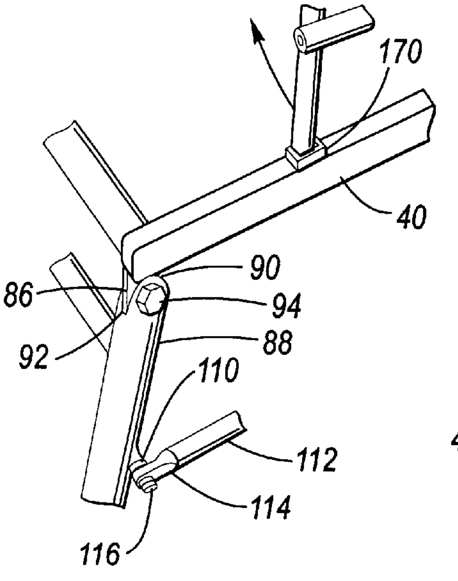
FIG. 11 is a perspective view of a front corner end of the wheelchair shown in FIG. 1 illustrating the removable connection between the upper side rails and the side rail.

Front legs 88 have a horizontally projecting stud 110 (FIG. 11). The stud 110 has pivotally connected thereto a side tensional support member 112. Side tensional member 112 has a front end 114. Front end 114 is pivotally connected to stud 110 via pivot pin 116. A rearward end 118 of the side tensional support member 112 is pivotally mounted with respect to post 20 (FIG. 7) by a pin 120. Pin 120 extends through an aperture in a bracket 122. Bracket 122 is fixably welded to the post 20.

Figure 3:
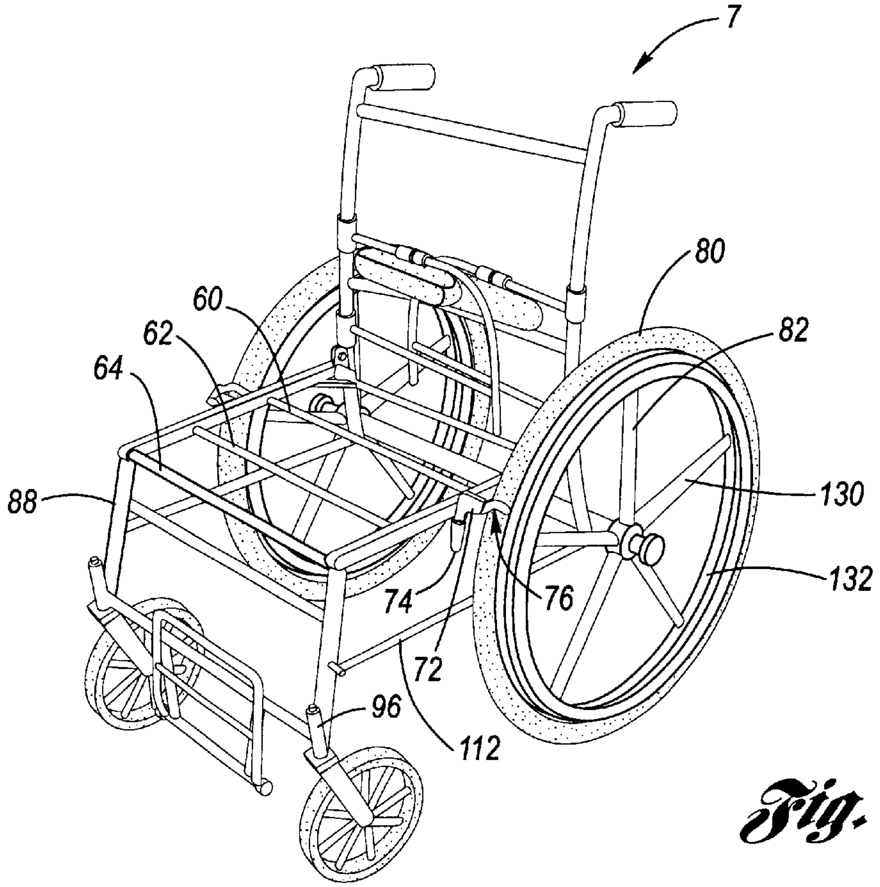
FIG. 3 is a view substantially similar to that of FIG. 2 illustrating a completion of folding of the upper side rails towards the posts.
Figure 4:
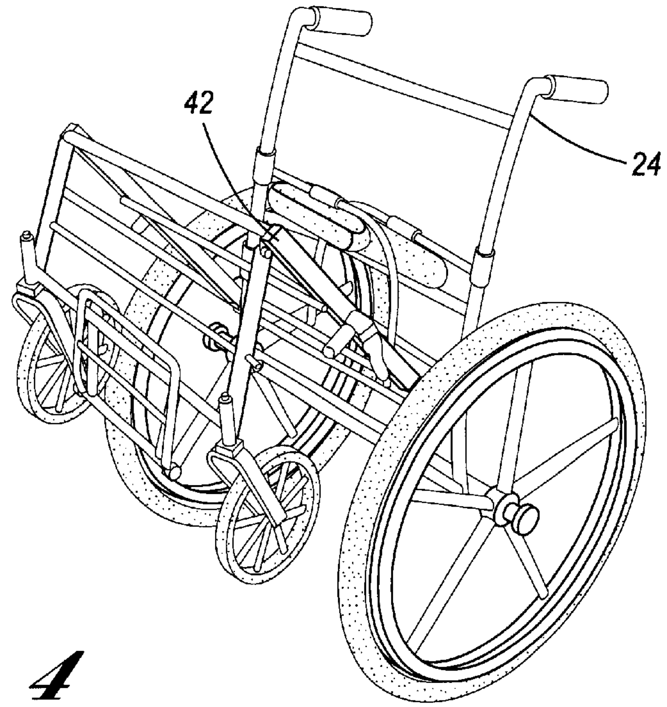
FIG. 4 is a view similar to that of FIG. 3 illustrating the initial folding of the wheelchair according to the present invention by moving a front end of the side rails towards an upper end of the posts.
Figure 8:
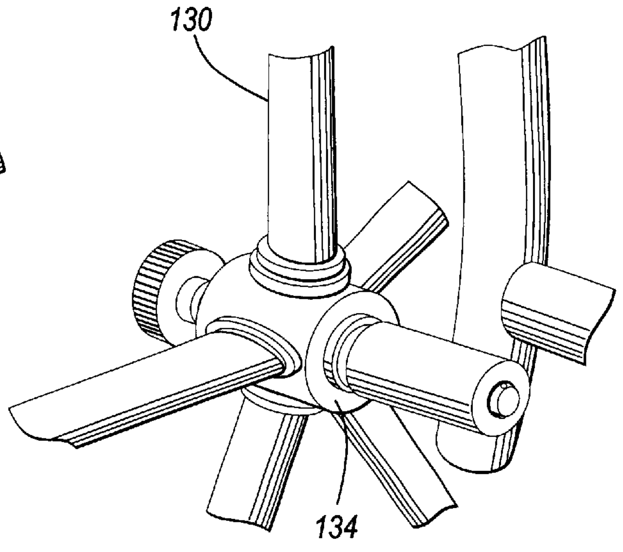
FIG. 8 is a view similar to that of FIG. 7 showing quick release pin and rear wheel being connected with the post.
Figure 9:
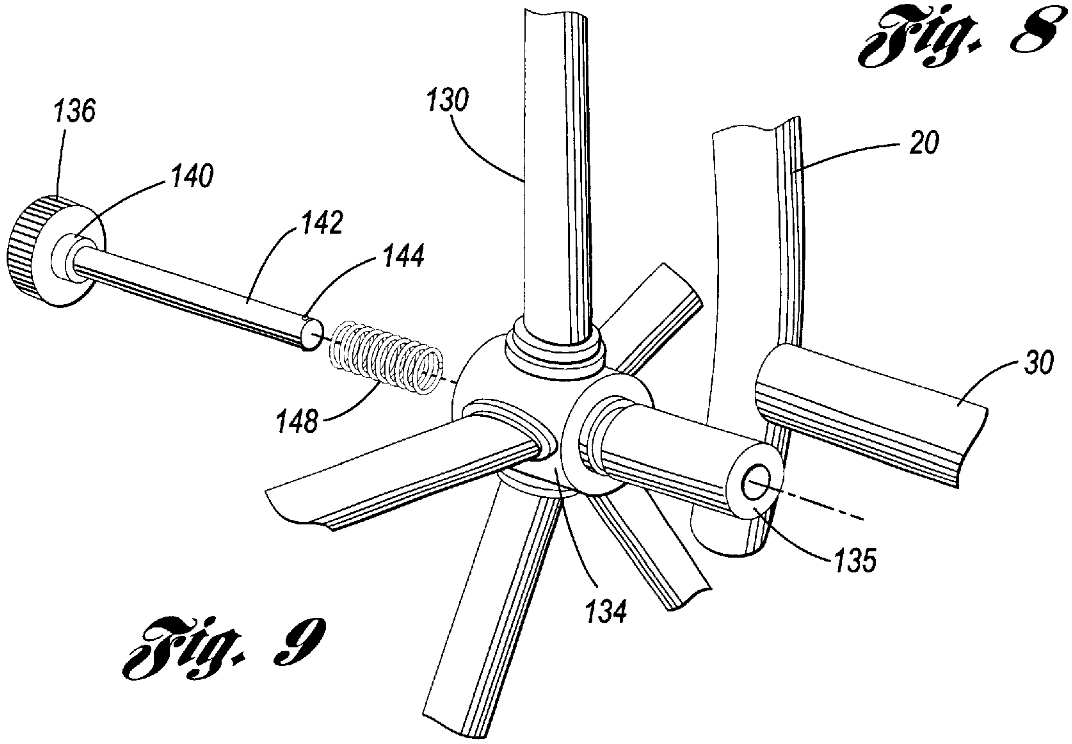
FIG. 9 is an exploded view of the quick release pin, quick release pin spring, wheel hub, pin mount and post according to the present invention.
Figure 10:
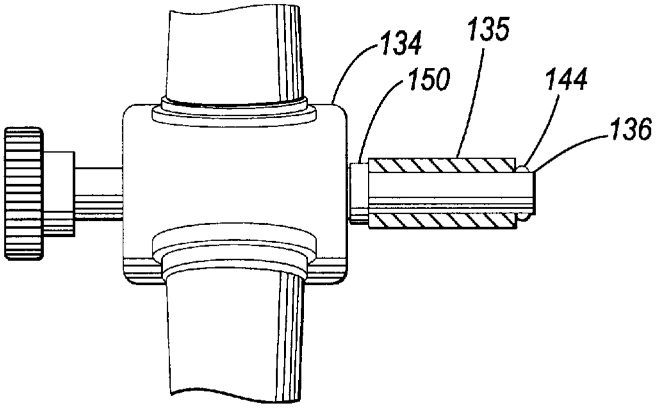
FIG. 10 is a view similar to that of FIG. 9 showing the quick release pin, quick release pin spring, a thrust bearing and the pin mount assembly.

Rear wheel 82 has a series of spokes 130 (FIG. 3). Spokes 130 support a rim 132 from a hub 134. Referring additionally to FIGS. 8 through 10. Posts 20 have weldably connected rearwardly thereto a quick removable pin housing or mount 135. A quick release pin 136 has a handle 138. Handle 138 has fixably connected thereto a shoulder 140. Projecting from shoulder 140 is an elongated shaft 142 having spring loaded retention balls 144. A coil spring 148 encircles shaft 142 and is seated against shoulder 140. To install a rear wheel 82 to the folding wheelchair 7, shaft 142 of the quick release pin 136 is inserted into coil spring 148. The remainder of shaft 142 is then inserted into wheel hub 134 and is inserted through the pin mount 135 until the retainer balls 144 re-emerge on the extreme inboard side of the pin mount 135. Before insertion through the pin mount 135 the pin shaft 142 is passed through a thrust bearing member or washer 150 (shown only in FIG. 10).

To remove rear wheel 82 from the folding wheelchair 7, quick release pin 136 is simply grabbed by its handle and pulled with such a force that retention balls 144 are urged inwardly to allow the quick release pin 136 to pass through the pin mount 135. Quick release pin 136 will usually, for convenience purposes, be left within hub 134 when rear wheel 82 is removed by the seat occupant or an assisting party.

Figures 12A, 12B:
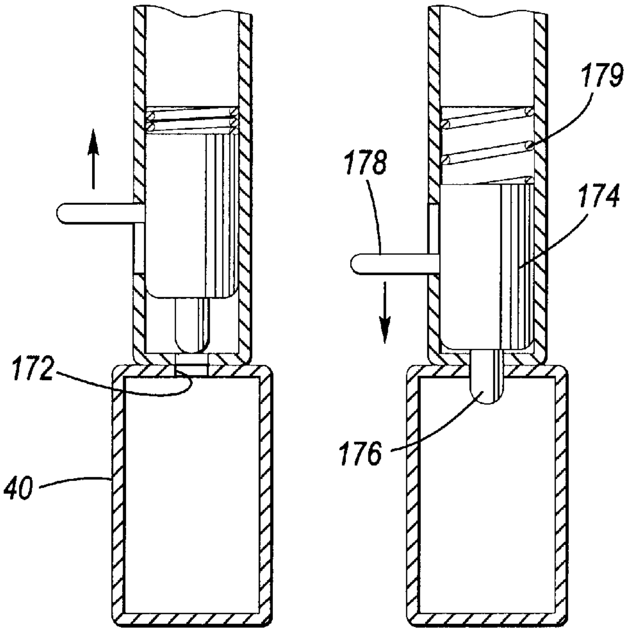
FIGS. 12A and 12B are sectional views illustrating the connection of the upper side rail with the side rail.
Figure 13:
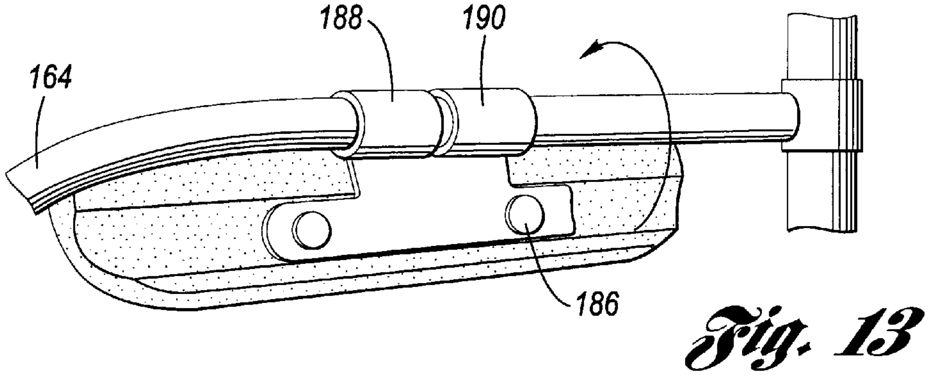
FIG. 13 is a sectional view illustrating the pivotal connection between the upper side rail and the armrest and the pivotal connection of the upper side rail with the post.
Figure 14:
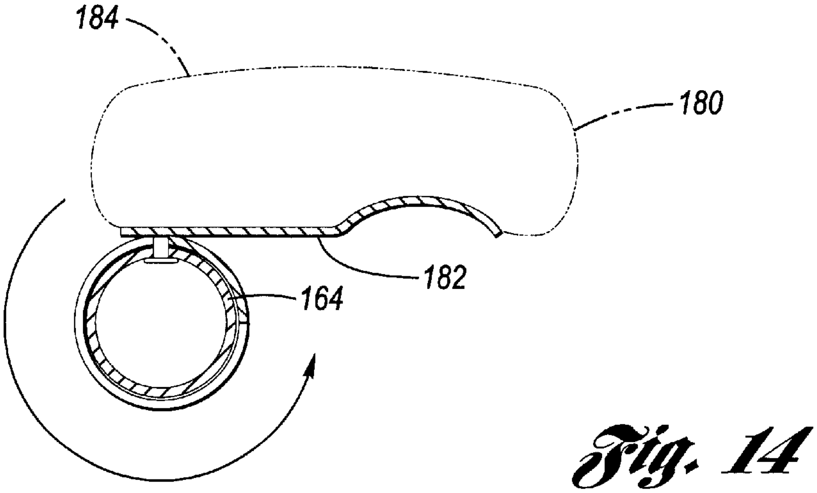
FIG. 14 is a sectional view of the armrest shown in FIG. 13 illustrating the armrest in the upright, normal operational position.

Referring additionally to FIGS. 12A through 13, the folding wheelchair 7 of the present invention has a transversely or inwardly pivoting upper side rail assembly 160. The upper side rail 160 has two members 162 and 164. Members 162 and 164 are both pivotally connected with the posts 20 via pivot collars 166 and 168, respectively. Pivot collars 166 and 168 pivot along the axis generally perpendicular to the axis of pivotal movement of side rail 40 with respect to posts 20. Upper side rail member 164 arcs vertically downward and is removably connected with side rail 40. Side rail 40 along its upper end has a nest 170 to limit the outboard movement of the upper side rail 160. On top of side rail 40 within nest 170 is an aperture 172. A spring 179 loaded pin 174 within member 164 has a locator 176 which can be aligned with aperture 172 of the side rail. After alignment is achieved, the spring loading upon the pin 174 locks the upper side rail 160 with the side rail 40. To remove upper side rail 160 from side rail 40 to allow it to be pivoted towards the seat back, there is provided a release handle 178 which allows locator 176 to be urged upwards against the force of spring 179. The upper member 164 has pivotally attached thereto an armrest 180. Armrest 180 has a metal base 182 joined to a cushion 184 by rivets 186. Base 182 is joined to two collars 188 and 190. Collars 188 and 190 allow armrest 180 to be pivoted to an outboard normal use position as shown in FIG. 1 or to be pivoted to its downward position as shown in FIGS. 2 and 13.

Figure 5:
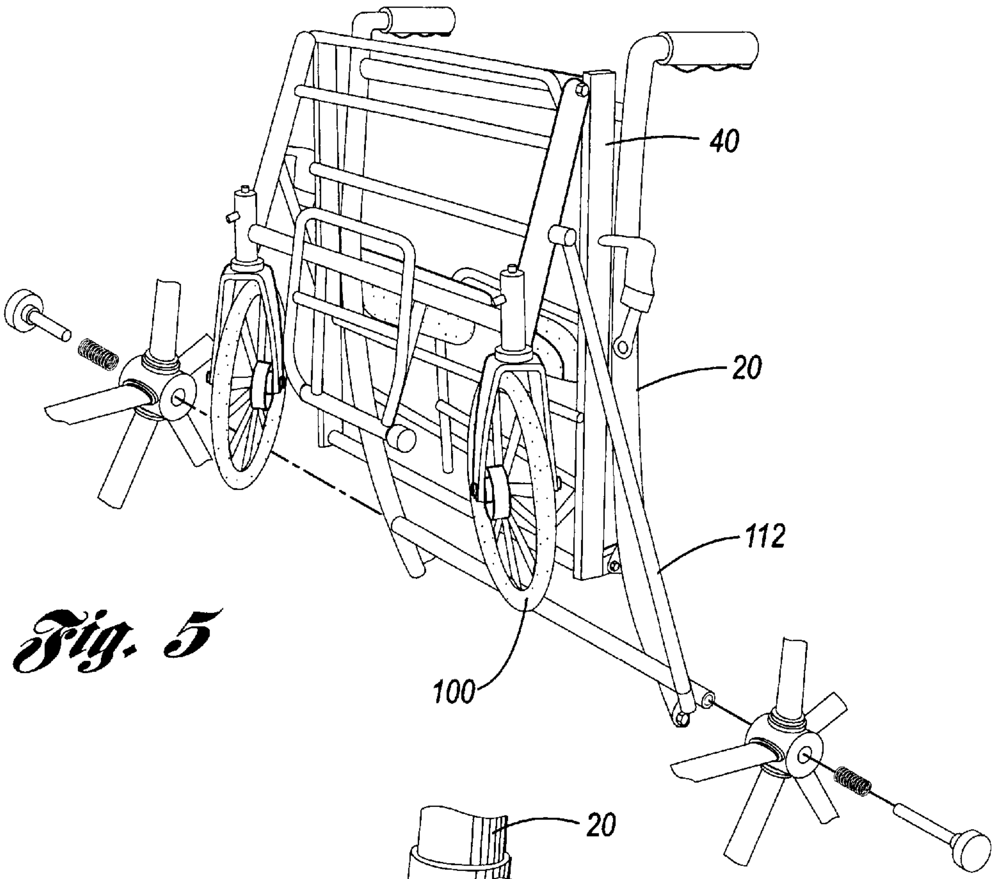
FIG. 5 is a perspective view of the wheelchair according to the present invention with the chair being fully folded to its vertical position with the rear wheels being removed.

In operation the wheelchair 7 is mainly utilized in the position shown in FIG. 1. When it is desired to fold the wheelchair 7 upper side rails 160 are released by an upward pull on release handle 178. Armrest 180 is pivoted downward and as shown in FIG. 2 the two upper side rails 160 are folded towards posts 20. Foot pedal 106 is pivoted upward to the position shown in FIG. 2. Referring to FIG. 3, wheel foot brake 72 is activated. The side rails front end 42 are then pivoted towards post upper ends 24. Rear wheel brakes 72 will naturally pull away from the rear wheel tire 80. As shown in FIG. 5, the front wheels 100 will pivot to make an even thinner profile of the folding wheelchair 7. Side structure support members 114 will also pivot causing front legs 88 to be pivoted towards side rails 40. Quick release pins 136 will be pulled outward causing shaft 142 of the pin 136 to be removed from pin mount 135. The wheelchair 7 can now be carried by its handles 26 and typically will be thin enough to be stored in a back seat of a vehicle. In many occasions the folding wheelchair 7 can be passed into a back seat of a two-door vehicle with a folding front seat because of the folded wheelchair's thin profile. Depending upon design considerations the seat cushions and seat back may be retained or removed from the wheelchair 7. Therefore, the seat cushion or seat back may have a hard rigid backing that cannot bend. Assembly of the wheelchair 7 can be achieved in generally in a reversal of the steps mentioned. However, if desired, the wheelchair 7 can be assembled with the last assembly step being the attaching of the rear wheels 82.

Although the present invention has been described with reference to a preferred embodiment thereof, it will be apparent to those skilled in the art that various alternatives and modifications can be carried out without departing from the scope of the present invention.

What is claimed is:

1. A folding wheelchair comprising:

first and second spaced apart posts, each said post having upper and lower ends;

first and second rear wheels rotatively mounted to said lower ends of said respective posts;

first and second spaced apart side rails, said side rails having a rear end pivotally connected with a respective post, and said side rails having a front end extending forward from said rear end;

first and second upper side rails pivotally connected with said respective posts along a pivotal axis generally perpendicular to a pivotal axis of the side rail with said posts wherein said upper side rails pivot inward toward the back of the wheelchair, a pivotal armrest on said upper side rails;

first and second front legs associated with a respective side rail, said front legs having an upper end pivotally connected with the respective side rail, said front legs having a lower end extending downwardly, and said front legs supporting said side rails;

first and second front wheels rotatively connected with said respective lower ends of said front legs supporting a front end of said wheelchair;

first and second side tensional support members, said side tensional support members having a front end pivotally connected with a respective front leg between said respective front leg upper and lower ends, and said side tensional support members having a rear end pivotally connected with respect to said respective posts;

a seat structure connecting the side rails, said seat structure supporting a person thereon, wherein said seat structure is selectively folded by pivoting said side rail front ends toward said respective post upper ends; and a back structure extending between said posts.

2. A folding wheelchair comprising:

first and second spaced apart posts each said post having upper and lower ends;

first and second rear wheels rotatively mounted to said lower ends of said respective posts via a pin having spring-loaded retainer balls;

first and second spaced apart side rails, said side rails having a rear end pivotally connected with a respective post along a first axis, and said side rails having a front end extending forward from said rear end;

first and second upper side rails, said upper side rails having a rear end pivotally connected with a respective post along an axis generally perpendicular to said first axis, said first and second upper side rails having a front end removably connected with a respective side rail, wherein said upper side rails pivot inward toward the back of the wheelchair and said first and second side rails have a nest that connects with and limits the outboard movement of said upper side rails;

first and second front legs associated with said respective side rails, said front legs having an upper end pivotally connected with a respective side rail, said front legs having a lower end extending downwardly, and said front legs supporting said side rails;

first and second front wheels rotatively connected with said respective lower end of said front legs supporting a front end of said wheelchair;

first and second side tensional support members, said side tensional support members having a front end pivotally connected with a respective front leg between said respective front leg upper and lower ends and said side tensional support members having a rear end pivotally connected with respect to said respective posts;

a seat structure connecting the side rails, said seat structure supporting a person thereon, wherein said seat structure may be folded by pivoting said side rail front ends towards said respective post upper ends; and a back structure extending between said posts.

3. A folding wheelchair comprising:

first and second spaced apart posts, each said post having upper and lower ends;

first and second rear wheels rotatively mounted to said lower ends of said respective posts;

first and second spaced apart side rails, said side rails having a rear end pivotally connected with a respective post, and said side rails having a front end extending forward from said rear end;

first and second upper side rails pivotally connected with said respective posts along a pivotal axis generally perpendicular to a pivotal axis of the side rail with said posts wherein said upper side rails pivot inward toward the back of the wheelchair;

first and second front legs associated with a respective side rail, said front legs having an upper end pivotally connected with the respective side rail, said front legs having a lower end extending downwardly, and said front legs supporting said side rails;

first and second front wheels rotatively connected with said respective lower ends of said front legs supporting a front end of said wheelchair;

first and second side tensional support members, said side tensional support members having a front end pivotally connected with a respective front leg between said respective front leg upper and lower ends, and said side tensional support members having a rear end pivotally connected with respect to said respective posts;

a seat structure connecting the side rails, said seat structure supporting a person thereon, wherein said seat structure is selectively folded by pivoting said side rail front ends toward said respective post upper ends; and a back structure extending between said posts;

wherein said first and second side rails have a nest that connects with and limits the outboard movement of said upper side rails.

* * * * *